United States Patent [19]

Kirk et al.

[11] Patent Number: 5,787,801
[45] Date of Patent: Aug. 4, 1998

[54] APPARATUS AND METHOD FOR CORING AND SECTIONIZING FRUIT

[75] Inventors: William J. Kirk, Alta Loma; Maurice V. Johnson, Jr., Upland; Jaxon W. Potter, Toluca Lake, all of Calif.

[73] Assignee: Sunkist Growers, Inc., Ontario, Calif.

[21] Appl. No.: 646,696

[22] Filed: May 3, 1996

[51] Int. Cl.[6] .............................. A23L 1/00; A23L 2/212; A23N 15/00; A23P 1/00

[52] U.S. Cl. ............................ 99/541; 99/537; 99/540; 99/584; 99/516

[58] Field of Search ........................ 99/516, 537–545, 99/567, 584, 588–594, 484, 509–511; 426/480–483, 489, 518, 287, 616; 83/881, 887; 241/46.11

[56] References Cited

U.S. PATENT DOCUMENTS

| | | | |
|---|---|---|---|
| 3,700,017 | 10/1972 | Vincent et al. | 99/590 |
| 4,139,651 | 2/1979 | Sekiguchi | 426/616 |
| 4,294,861 | 10/1981 | Ifuku et al. | 99/516 X |
| 4,300,448 | 11/1981 | Hayashi et al. | 99/584 X |
| 4,560,572 | 12/1985 | Watanabe | 241/46.11 |
| 4,729,299 | 3/1988 | Hatch | 99/491 |
| 4,738,194 | 4/1988 | Ando et al. | 99/484 |
| 4,770,092 | 9/1988 | Curtis et al. | 99/584 |
| 4,885,182 | 12/1989 | Kolodesh et al. | 426/482 |
| 4,937,088 | 6/1990 | Gosselin et al. | 426/481 |
| 4,959,903 | 10/1990 | Daoust et al. | 30/123.5 |
| 4,977,826 | 12/1990 | Kock et al. | 99/516 |
| 5,000,967 | 3/1991 | Adams et al. | 426/482 X |
| 5,044,268 | 9/1991 | Lin | 99/541 |
| 5,088,393 | 2/1992 | Nahir et al. | 99/567 X |
| 5,101,718 | 4/1992 | Lin | 99/545 |
| 5,170,698 | 12/1992 | Kirk | 99/584 X |
| 5,196,222 | 3/1993 | Kirk | 426/482 |
| 5,199,350 | 4/1993 | Lin | 99/543 |
| 5,200,217 | 4/1993 | Elliott et al. | 426/287 X |
| 5,231,921 | 8/1993 | Kirk | 99/540 X |
| 5,241,902 | 9/1993 | Gangi | 99/538 |

*Primary Examiner*—Timothy F. Simone

[57] ABSTRACT

A high speed, high volume fruit sectionizer is comprised of a pair of suction cup conveyors onto which fruit is loaded. The fruit is coupled by means of suction attachment to a first conveyor and carried to a position wherein the opposing side of the fruit is suction coupled to the second conveyor. The fruit is drawn through a halving guillotine and coring blade. The fruit halves are then positioned on scooping and sectioning assemblies. A rotating semicircular hoop blade cuts the fruit meat away from the peel while leaving the fruit meat and peel in place. The separated peel and fruit meat are moved across the scooping and sectioning assembly through a blade assembly which sections the fruit meat. The meat sectioning blade has a first portion which cuts through the peel and fruit meat to establish a first radial extent of the section cut. A following portion of the same blade is provided with a dull edge which completes the section cut of the fruit meat, but is not sharp enough to cut the peel or to cut any portion of the conveyor. The conveyor retains uninterrupted suction attachment with the partially sliced fruit peel and is undamaged by the suctioning blade(s). The fruit meat sections then fall away from the peel, which latter is moved by the conveyor to a disposal position.

9 Claims, 10 Drawing Sheets

APPARATUS AND METHOD FOR CORING AND SECTIONIZING FRUIT

BACKGROUND OF THE INVENTION

1. Field of the Invention

This invention relates to the field of fruit processing methods and apparatus and, in particular, to methods and apparatus for scooping the meat from citrus fruit and sectioning the extracted fruit meat.

2. Description of the Prior Art

Citrus fruits are generally comprised of an outer colored peel (flavedo), an inner white spongy peel (albedo) and a central meat formed in wedge shaped segments, that are collectively surrounded by a fibrous membrane network, commonly referred to as "rag". Within the meat is a core, comprised of essentially the same pectin substance comprising the albedo, which extends axially from the stem end to the blossom end of the fruit. In most varieties the core is surrounded by seeds within the adjacent meat. The individual meat segments primarily comprise juice sacks, which are elongated, oval elements that contain fruit juice and are held together by an epicuticular wax. Insofar as human consumption is concerned, the juice sacks are considered the most valuable portion of the fruit, the other components—the peel, rag, core and seeds—primarily having other uses in production of cattle feed, essential oils and the like.

The prior art has devised various methods and apparatus by which the fruit meat can be extracted.

In the system described in U.S. Pat. No. 3,700,017, an axially-oriented fruit is placed between two spikes that are sharply driven, respectively, into the stem and blossom ends of the peel. The spikes and attached fruit are then rotated while two knives move laterally across the rotating fruit to cut the peel from the meat. Although such a system does effectively extract the meat from the fruit, it does not eliminate the core, and cutting the peel in this fashion releases bitter peel oils and other undesirable flavor components found in the peel, which contaminate the meat. Furthermore, in order to allow the spike to be inserted into the fruit's stem and blossom ends, where the core lies beneath the peel, fairly precise orientation of the fruit is critical for the successfully peeling the fruit.

Other systems have evolved various types of chemical baths, which dissolve the various fruit membranes, as shown in U.S. Pat. Nos. 4,560,572 and 4,139,651. And still further systems enzymatically detach the meat from the albedo by infiltration of pectinase into the albedo, beneath the flavedo, such as shown by U.S. Pat. Nos. 5,000,967; 5,170,698; 5,196,222; 5,231,921; and 5,200,2172. However, such systems have a limited volume throughput, because of the processing time required to obtain enzymatic breakdown of the pectinase comprising the albedo layer of the peel, and such processes entail additional costs associated with the necessary enzymes and the related heating, cooling and other processing apparatus.

Still another extraction method uses high pressure fluid jets, as shown by U.S. Pat. Nos. 1,982,741; 4,294,861; and 4,300,448, in which the fruit is oriented and cut in half, and the exposed meat is placed in front of a fluid jet nozzle. High pressure fluid emitted from the nozzle blasts the fruit meat from the peel. These systems have limited commercial practicality because of the large volume of pressurized fluid required to obtain commercially acceptable yields. Furthermore, they are limited by the criticality of the orientation of the fruit and by the fact that sectional membranes tend to fold over and impede the fluid jet's ability to remove the meat most deeply seated within the peel.

Yet another system is shown by U.S. Pat. No. 4,885,182, which feeds the fruit into a dual conveyor and extraction apparatus that includes a plurality of suction cups for holding the fruit. After the fruit is cut in half, the halves are indexed through successive meat extraction and removal stations. The extraction station includes an extraction element that separates a hemispherical section of meat from the peel. The removal station includes a removing element that gently removes any fruit meat remaining within the peel after the bulk of the meat has already been removed. The extraction station includes a rotating, ladle-shaped extraction element having a cutting bowl. While rotating, the cutting bowl is rotated 90 degrees such that its sharp peripheral edge severs the hemispherical chunk of meat from the peel, similarly to a spoon scooping ice cream from a carton. In theory, the severed meat chunk tumbles from the peel and is collected for subsequent processing. But in any event, the core adheres to the hemispherical chunk.

Among the many obvious problems with the latter prior art apparatus is the fact that the edge of the cutting bowl (i.e., the "spoon") quickly dulls, and when dull, it is substantially ineffective in extracting the meat from the peel. Secondly, even if and when cleanly cutting the meat from the peel, the apparatus has no means by which the extracted meat half can be sectioned. The extracted halves are removed from the peel as hemispherical chunks, by a means which is not clearly shown. Thirdly, as the fruit size changes, the size of the entire cutting bowl and the extraction station must also be changed. The cost of manufacturing the cutting bowls in different sizes is high, and severely limits the economic practicality of the device. Certainly, in a juicing operation (for which that apparatus was apparently invented), these disadvantages might be tolerated. However, they render the apparatus ineffective for rapidly producing cleanly sectioned and cut fruit on a long-term, cost-effective basis.

Therefore, what is needed is some type of apparatus which can economically and practically provide cleanly removed and cut fruit meat in commercial volumes, and can operate efficiently on varying sizes of fruit.

BRIEF SUMMARY OF THE INVENTION

The invention is an apparatus for extracting meat from a peel of a fruit comprising a pair of suction conveyors onto at least one of which the fruit is loaded into a plurality of predetermined suction cup assembly positions. A corresponding suction cup assembly in the other conveyor then grips the fruit, so that it is held firmly on both sides. A guillotine blade then cuts the fruit longitudinally into two halves, while a coring knife removes the fruit core. Each of the two halves is then carried onward by one of the two conveyors. Following this, two scooping and sectioning blade assemblies—one associated with each conveyor—hemispherically cut the meat of each fruit half from its respective peel half and sections the hemispheric chunk of meat, while the peel of each fruit half continues to be coupled to its suction cup assembly on its respective conveyor. After removal of the fruit chunk sections, the suction conveyors then transport the peel halves to a disposal position and selectively decouple them from their respective suction cup assemblies. As a result, cleanly cut and sectioned fruit meat is extracted from the fruit, and the peels are salvaged for further processing and possible use as cattle feed.

The apparatus further comprises a vacuum distributor coupled to the suction cup assemblies for selectively applying a vacuum to the plurality of suction cup assemblies on each suction conveyor and for selectively venting the suction cup assemblies to atmosphere, to selectively couple and decouple the fruit and fruit peels from the suction conveyors.

The suction conveyors and scooping and sectioning blade assembly are selectively configurable to accommodate different sizes of fruit. The scooping and sectioning blade assembly is modular and interchangeable with other scooping and sectioning blade assemblies, and is quickly interchangeable in order to accommodate different sizes of fruit and for providing replacement blades within the assembly.

The scooping and sectioning blade assembly comprises a semicircular scooping blade for scooping the meat from the fruit and a sectioning blade for cutting the scooped fruit meat into sections. The fruit is oriented in a predetermined direction—with the axis, from stem to blossom end, generally alligned with the direction of travel—when loaded into the suction conveyors, so that the sectioning blade can section the meat along section planes generally oriented with natural sections within the fruit meats. However, such orientation need not be precise for effective operation of the apparatus and method, and this is one advantage of the present invention.

The sectioning blade cutting edge has a first leading portion provided with a sharp slicing edge and a following portion having a dull edge, so that the dull edge of the second portion does not cut the rind of the fruit nor any part of the suction cup assembly (whose contact with the fruit is normally by means of a flexible, non-metallic member), but is sufficient to complete sectioning of the meat begun by the first portion of the sectioning blade.

As previously pointed out, each of the suction conveyors is provided with a plurality of suction cup assemblies. Each suction cup assembly is comprised of a valved suction cup for establishing a suction coupling to fruit disposed therein, and an ejector to eject the fruit from the section cup assembly when vacuum is selectively released therefrom.

The invention is also defined as an improvement in an apparatus for sectioning the meat contained within the peel of a fruit. A plurality of the fruit is carried by a suction conveyor, and the fruit is cored and halved. The improvement comprises at least one sectioning blade which is drawn through a fruit half while the fruit is coupled by suction to the suction conveyor. The sectioning blade has a leading sharp slicing edge and a following dull separating edge. The leading sharp slicing edge cuts a section within the fruit half beginning near the cored axis of the fruit and extends outwardly through the fruit half to a predetermined first radial position near the inside of the peel. Whereupon, separation of the section from one another and from the peel is completed by the following dull separating edge, which extends the separation to a second radial position, close to the radial point at or beyond that radius at which the meat will normally have been separated from the peel, so that the meat sections are substantially completely separated each other and from the peel without the sectioning blade cutting any part of the suction cup assembly, or even cutting through the peel so as to interfere with suction coupling between the fruit and the suction cup assembly. At least one sectioning blade is utilized and oriented outwardly from the axis of the sectioning blade assembly to provide a plurality (i.e., one more than the number of blades) of longitudinal sectional separations through the meat. A modular interchangeable base is provided into which the sectioning blade is removably disposed, so that the blade may be removed from the apparatus and quickly replaced by another, so that a properly sharpened sectioning blade is always provided within the apparatus without requiring extensive downtime for resharpening or replacement thereof.

The improvement further comprises at least one semicircular knife blade rotatable through the meat which has an approximately equal radius to the fruit meat. The semicircular knife blade is a simple, one-piece curved razor-like structure, readily interchangeable, so that when dulled it may easily be removed and replaced by an identical new one, or resharpened.

The invention is also characterized as an improvement in a suction conveyor having a plurality of suction cup assemblies for receiving fruit. The suction conveyor continuously transports the fruit through a plurality of positions for processing, and then disposes of the processed portions of the fruit retained within the suction cup assemblies. A vacuum is supplied to the suction cup assemblies from a vacuum source. The improvement comprises a vacuum distributor having a plurality of ports selectively communicating with each of the plurality of suction cup assemblies. Selected ones of the plurality of ports selectively communicate to atmosphere or to the vacuum source, so that suction coupling of the suction cup assembly to the fruit may be selectively released or applied. Selective communication of the plurality of ports to atmosphere and to the vacuum source is achieved by rotating the plurality of ports in sealed relationship past a first circular slot communicating with atmosphere and a separate second circular slot communicating with the vacuum source.

The vacuum distributor comprises a rotatable circular orifice plate having the plurality of orifices defined therethrough and a stationary distribution plate having the first and second circular slots defined therein. The first circular slot is vented to atmosphere and the second circular slot communicates with the vacuum source.

The invention is still further characterized as an improvement in a vacuum cup assembly used in a vacuum conveyor. The vacuum cup assembly has a vacuum selectively applied to a vacuum port thereof. The improvement comprises a cup housing and a cup cap disposed and sealed to the cup housing to provide an enclosure for the cup housing, except for a venting orifice defined through the cup cap. A spring-loaded finger is disposed in the cup housing and passes within the venting orifice. The finger extends through the cup cap to contact a fruit which is disposed in the suction cup assembly. The fruit, when disposed in the suction cup assembly, presses against the finger, causing it to withdraw somewhat through the venting orifice to break the vacuum seal and thereby cause a suction between the cup cap and the fruit, which counteracts the forward spring force of the finger against the fruit and thus allows the cup assembly to hold the fruit. The finger ejects the fruit from the cup cap when vacuum is removed from the cup housing and there is thus no longer any counterforce against the spring. The fully extended finger again seals the venting orifice to prevent suction loss. A vacuum is re-established within the cup housing when the next fruit is pressed against the finger.

The spring-loaded finger comprises a guide post disposed in the housing directed toward the venting orifice. A compression spring is disposed about the guide post. An ejector is disposed on the guide post and is resiliently urged outward through the venting orifice and extended from the cup cap by the spring. The ejector has a sealing valve flange formed thereon to provide a vacuum seal with the venting orifice when the ejector is fully extended through the venting orifice by the coil spring and when the flange is thus disposed in sealing relationship with the venting orifice.

The invention is defined further as a method of sectioning and extracting fruit meat from a fruit. The fruit meat are disposed within a peel. The method comprises the steps of halving the fruit into two substantially equal hemispherical halves and removing the axial core from the fruit—with a longitudinal (i.e., stem to blossom end) cut or cuts—while retaining half of the fruit meat within its respective separated peel half. The fruit meat is sectioned while being retained within the peel. The sectioned and separated fruit meat portions are then separated from one another and from the peel. Cleanly cut fruit sections are thus obtained.

In the illustrated embodiment the step of cutting the fruit meat from the peel occurs prior to sectioning the fruit meat. However, it is also possible that the step of sectioning the fruit meat can occur prior to cutting the fruit meat from the peel.

The step of sectioning the fruit meat comprises slicing through the fruit meat from its axis to a first predetermined radial extent and subsequently separating the fruit meat from the peel along the sliced separations without further slicing the peel, to permit continued retention of each fruit half by its respective suction cup assembly. In particular, the step of slicing is performed by a leading sharp cutting edge of a blade thrust longitudinally into the fruit meat half, and the step of separating the fruit meat along the sliced separation is achieved by continuing separation of the fruit meat with a following dull portion of the same blade.

The invention may now be better visualized by turning to the following drawings wherein like elements have been referenced by like numerals.

BRIEF DESCRIPTION OF THE DRAWINGS

FIG. 7b is a perpendicular cross-sectional view of FIG. 7a as seen through lines 7b—7b of FIG. 7a.

The invention and its various embodiments may now be better understood by turning to the following detailed description.

DETAILED DESCRIPTION OF THE PREFERRED EMBODIMENTS

A high speed, high volume fruit sectionizer is comprised of a pair of suction cup conveyors onto which individual fruit are introduced. The fruit is coupled by means of suction attachment to a first conveyor and carried to a position wherein the opposing side of the fruit is suction coupled to the second conveyor. The fruit, now carried on opposing sides by both conveyors, is drawn through a guillotine and coring blade. The cored fruit halves are retained by their respective conveyors and positioned on corresponding scooping and sectioning assemblies. A rotating semicircular hoop blade in each scooping and sectioning assembly cuts its corresponding fruit meat half away from its peel while leaving the fruit meat and peel in place by contact against the base of the scooping and sectioning assembly. The separated peel and fruit meat are then collectively moved through a pair of dihedral blades at the downstream end of the scooping and sectioning assembly, which section the fruit meat along lines of separation generally alligned with the natural section separations of the fruit meat.

It is to be understood that the pair of sectioning blades, employed in the principal embodiment, can be replaced by one or several blades, depending on the number of sections into which a fruit half is to be separated, that number being one more than the number of blades.

Each sectioning blade has a first slicing portion which thrusts through the fruit (by relative motion of the fruit in respect thereto) along its axis. The increasing width of the blade, as the fruit continues to move onto it, causes the blade to cut radially outward toward the outer portion of the fruit meat to establish a first radial extent of the section cut. A following portion of the same blade is provided with a dull edge which continues the section cut of the fruit meat radially outward, but which is not sharp enough to effectively cut the peel or to cut any portion of the suction cup assembly. Thus, the suction conveyor, through a suction cup assembly, retains uninterrupted suction attachment with the partially sliced fruit peel and is undamaged by the sectioning blades. The separated and sectioned fruit core then falls away from the peel, which is moved by the conveyor to a disposal position at which the vacuum is selectively vented and the fruit peel drops away and is separately collected.

Figure 1:
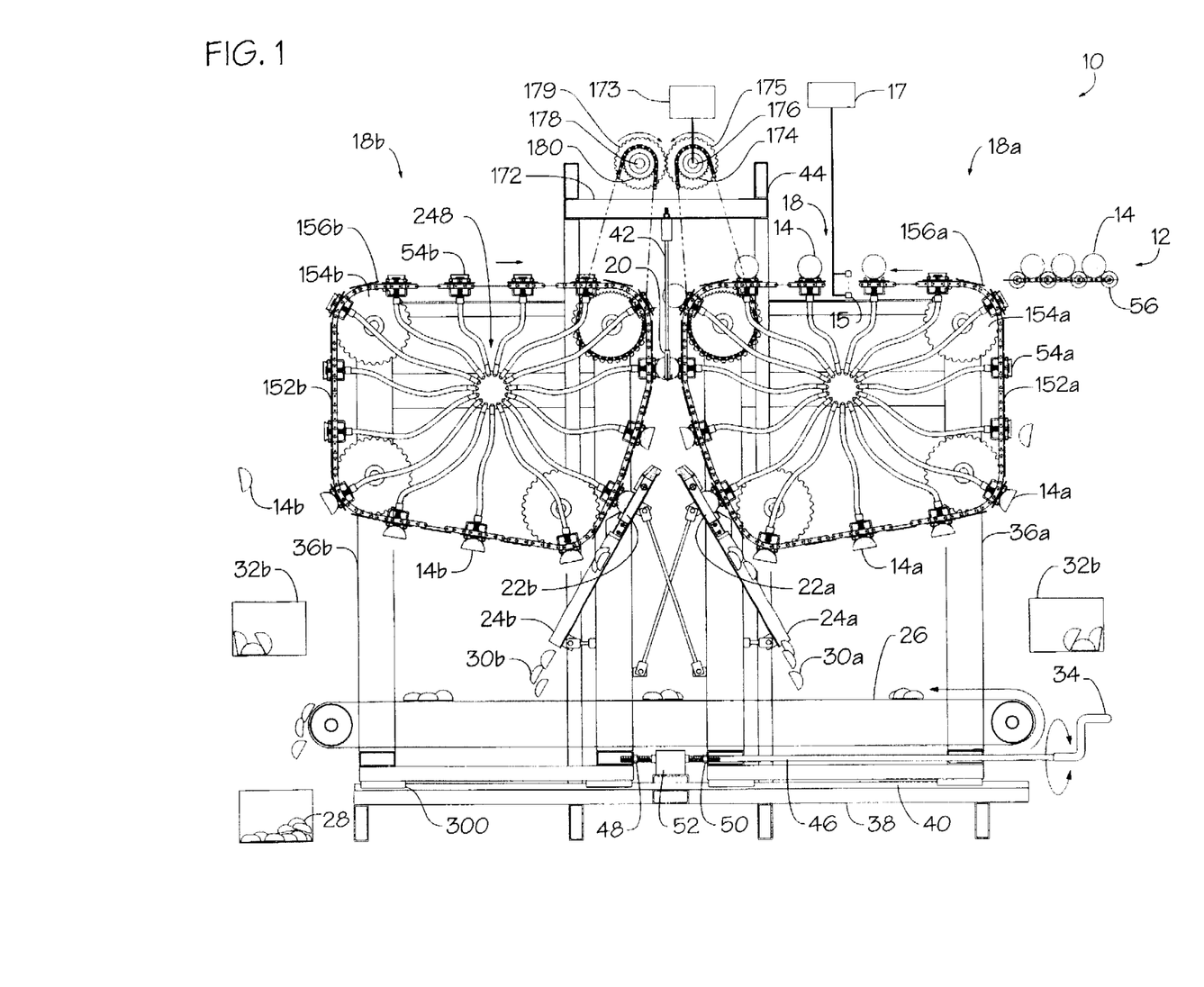
FIG. 1 is a simplified elevational side view of the apparatus of the invention depicting its operation.

The mechanical peeling apparatus, generally denoted by reference numeral 10 in FIG. 1, is first generally described in terms of the subsystems of which it is comprised, and then each subsystem shall be described below in detail. The mechanical peeler 10 may be comprised of a plurality subsystems, including a fruit conveyor, generally denoted by reference numeral 12 and which may include a conventional spin-orientation apparatus (not explicitly shown), feeding a plurality of fruit 14 to the fruit introduction station which is located at the left extreme of the fruit conveyor in FIG. 1. At the fruit introduction station, fruit 14 is loaded onto a vacuum suction cup conveyor system 18, by mechanical means or by hand. Vacuum suction cup conveyor system 18, as shown in side elevation in FIG. 1, actually comprises two separate suction conveyors, one of which 18a is loaded with fruit and the other of which 18b provides a synchronized opposing vacuum cup suction conveyor 18b for holding the opposing half of the severed fruit, 14a and 14b. The corresponding two suction conveyors, together comprising the vacuum suction cup conveyor system 18 are correspondingly referenced by reference numerals 18a and 18b, which correspond to fruit halves 14a and 14b, respectively, which are carried by them.

After being cored and cut in half by blade 20, each fruit half 14a and 14b is scooped and sectioned by scooping and sectioning assemblies 22a and 22b respectively. The sectionized meat cores are then fed via chutes 24b and 24a, respectively, onto a delivery conveyor 26 and thence to a collection bin 28. The empty peel halves 14a and 14b are carried to the outer ends of the mechanical peeling apparatus 10 by means of suction conveyors 18a and 18b respectively, and then released onto a waste conveyor (not shown) as described below to be collected within peel bins 32a and 32b, of which only the latter is illustrated in FIG. 1.

Figure 2:
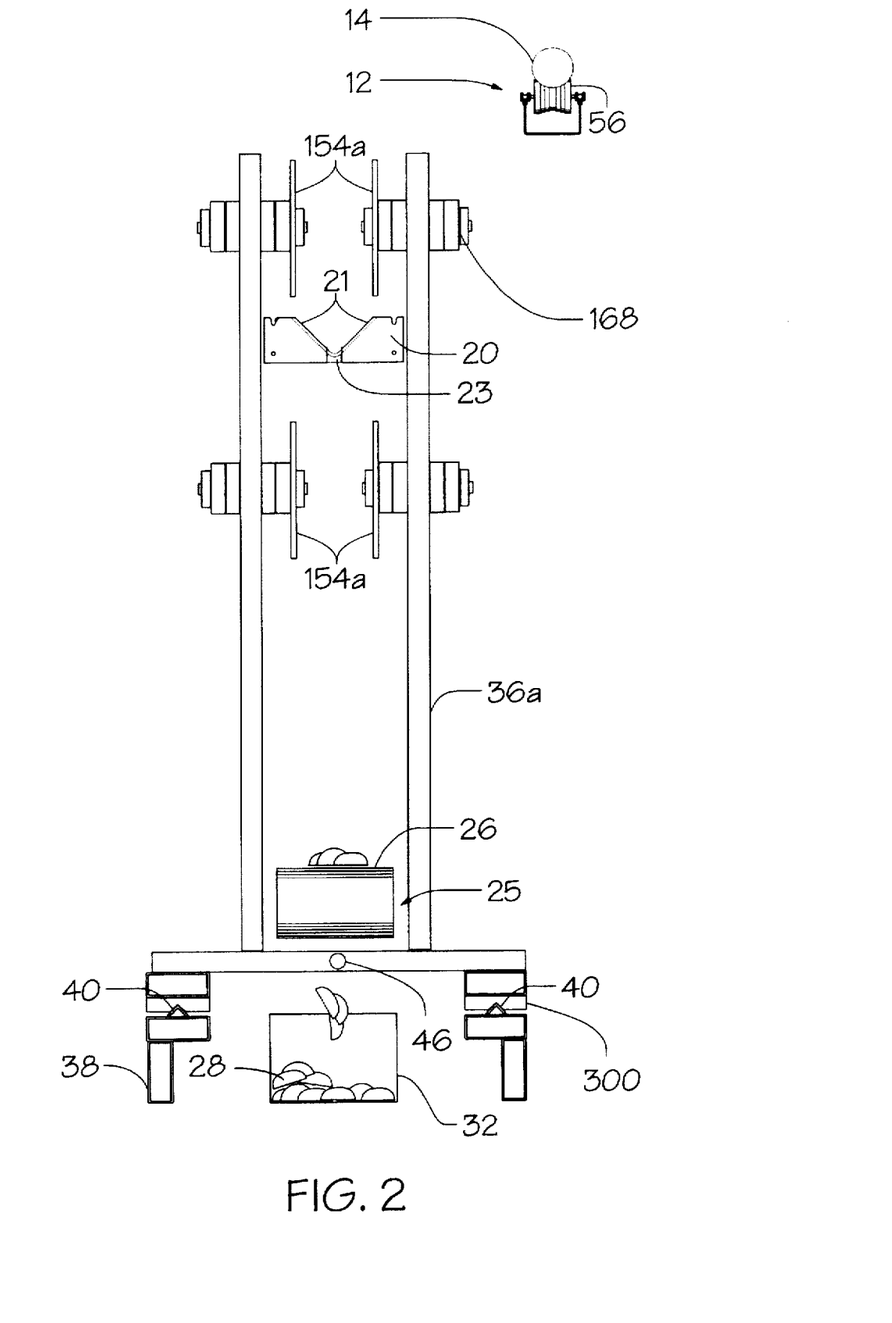
FIG. 2 is a simplified end elevational view of the apparatus of FIG. 1.

Different sized fruit, ranging from small tangerines to large grapefruit, can be accommodated by the mechanical peeling apparatus 10 by means of adjustment of chutes 24a and 24b through a manually or motorized rotated adjustment handle 34 (to account for differences in outside fruit diameter), together with quick interchange of fruit scooping and sectioning assemblies 22a and 22b (to account for average diameter of the meat "sphere" within the fruit). Each suction conveyor 18a and 18b is independently supported on a corresponding movable frame 36a and 36b, as shown in FIG. 1. In FIG. 1 a portion of the frame 36b has been removed to better show the underlying suction conveyor 18b. Frames 36a and 36b are supported by a stationary frame 38, which includes a plurality of low friction plastic bearing feet 300 riding on guide rails 40, as best depicted in FIG. 2, which is a simplified elevational end view of mechanical peeling apparatus 10, as shown in FIG. 1. Portions of fruit scooper and sectionizer 10, in particular vacuum suction cup conveyor 18a, has been removed from the illustration of FIG. 2 for ease of visualization.

Rotational of handle 34 shown in FIG. 1 rotates rod 46, whose end 48 is threaded into receiving nuts fixed to frames 36a and 36b. End 48 of rod 46 is supported by bearing block 52. The threading on end 48 on each side of bearing block 52 is opposite, so that rotation of rod 46 will drive movable frames 36a and 36b in opposing directions on rails 40 of stationary frame 38. For example, clockwise rotation of rod 46 may be arranged to draw frames 36a and 36b on guide rails 40 towards each other, while counter-clockwise rotation of rod 46 moves them apart, which is better visualized by comparing FIGS. 4a and 4b as will be described below.

The overall subsystems and the general nature of their relationships to each other having now been described, we consider the overall operation of mechanical peeling apparatus 10. Fruit 14 is provided by a fruit conveyor 12, upon which it will normally have been oriented with its axis at a right angle to the direction of movement. The fruit 14 thus delivered to the mechanical peeling apparatus 10 is removed from the fruit conveyor 12 and loaded onto the suction conveyor 18a This may be done mechanically or by hand. However, the fruit must, in the process of insertion, be rotated by 90 degrees, so that the fruit axis, while in the suction conveyor 18 is aligned generally with the direction of travel thereon.

Figure 2A:
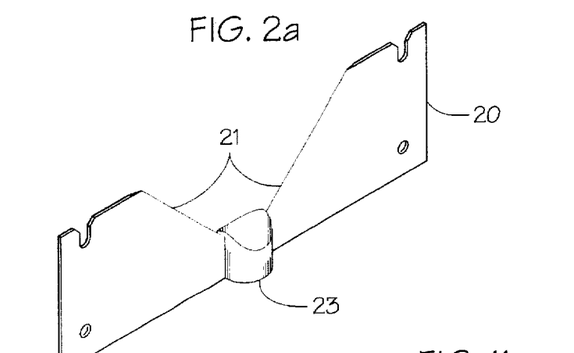
FIG. 2a is a perspective view of the guillotine blade shown in FIGS. 1 and 2.

Each suction cup assembly 54a on suction cup 18a is thus loaded with a fruit 14 and then carried to the center position of the mechanical peeling apparatus 10, as shown in FIG. 1, at which point its opposing side is attached to corresponding suction cup assembly 54b on suction cup conveyor 18b. The fruit 14 is then carried downward until it is cored and sliced in half by guillotine cutter blade 20, which is best depicted in FIGS. 2 and 2a, with the guillotining method clearly illustrated in FIGS. 3–4b. Fixed guillotine blade 20 including the cylindrical, central coring portion 23 is clearly shown in FIG. 2 in isolation of its supporting fixture 42, which connects it and holds it in a predefined position relative to a fixed non-movable frame 44 of the mechanical peeling apparatus 10. It is also within the scope of the invention to mount blade 20 on a vertically movable rod, so that forward movement of blade 20 is combined with the advance of fruit 14 by suction conveyors 18a and 18b to assist in cutting and coring fruit 14. However, in the preferred embodiment, blade 20 is fixed into position and rigidly connected to stationary frame 38, the movement of fruit 14 by suction conveyors 18a and 18b normally being sufficient to draw fruit 14 through blade 20 and its coring portion 23.

The guillotined fruit halves 14a and 14b are then carried by conveyors 18a and 18b, respectively, and drawn across fruit scooping and sectioning apparatus 22a and 22b, respectively, in the lower part of the mechanical peeling apparatus 10, as is better shown and described in connection with the illustrations of FIGS. 3–4b, and in particular in connection with the fruit scooping and sectioning apparatus of FIGS. 6–9. The separated and suctioned meat halves 30a and 30b are then delivered to chutes 24a and 24b respectively, and are gravity fed to conveyor 26 and taken to collection bin 28. Meanwhile, the meat-free peels 14a and 14b are retained by suction conveyors 18a and 18b, respectively, and moved to their outer positions, at which point the suction is selectively removed from suction cups 54a and 54b, releasing peel halves 14a and 14b for collection in a peel bin 32a and 32b, possibly by means of a waste conveyor (not shown).

The overall operation of the mechanical peeling apparatus 10 now having been described in connection with FIG. 1, we now consider each of the component sub-systems and its respective operation. Fruit conveyor 12 is only partially shown in the illustration of FIGS. 1 and 2. Since spin orientation conveyors are conventional and well known to the art, little detail is shown in the fruit conveyor 12. Suffice to say that it may be comprised of an endless loop of spools 56 carried on a double chain conveyor and riding on a rail, which spools 56 take delivery of sized fruit 14 from a delivery bin (not shown), or preferably from a sizer and grader, it being understood throughout this discussion that fruit 14 are sized within certain predetermined tolerances, at least as to average diameters.

In any event, the fruit 14 is, through conventional means, loaded onto fruit conveyor 12. As shown in end elevational view in FIG. 2, each spool 56 of the fruit conveyor 12 is comprised of a plurality of different sized rings in order to form a stepped frustoconical shape, which defines a pocket between two adjacent spools 56 into which fruit 14 settles and may be spun by imparting relative motion to the spools in a conventional manner. Since fruit 14 are generally oblate, or have a slightly smaller diameter on their equator, in a direction perpendicular to the axis of the fruit core, as fruit 14 spins it will ultimately fall or settle into an orientation in which the axis of the fruit core is parallel to the axis of spool 56, which is perpendicular to the plane of the illustration of FIG. 1 and also perpendicular to the direction of its travel on the fruit conveyor 12.

Since it is desireable for the axis of fruit 14 to coincide with the direction of its travel on the suction conveyor 18a, its axis must be turned 90 degrees. Thus, whether loaded from the fruit conveyor 14 onto the suction conveyor 18a mechanically or by hand, the axis of the core of the fruit is oriented into the plane of FIG. 1 at the delivery position to conveyor 18a. A vacuum cup assembly 54a of the vacuum suction conveyor system 18a seizes each fruit 14 and carries it through guillotine blade 20 and corer 23, which respectively slice through the axis of the fruit 14 to divide it into two halves separated from its axial plane and remove its axial core.

The natural fruit segments of fruit 14 then generally form dihedral angles with the hemispheric guillotine cut defined by blade 20, so that when fruit halves 14a and 14b are drawn across sectioning blades on scooping and sectioning assemblies 22a and 22b, the section cuts will be in the same orientation relative to the fruit axis as the natural fruit segments within the meat. Therefore, when the natural segments of the fruit meat sections are broken apart, the blade-defined sections also break apart into even thinner similar sections. A different orientation would cause the fruit halves to break apart into odd sized fruit chunks were the fruit oriented in a different direction, thus necessitating the step of turning the fruit 14 through a 90 degree angle when it is fed onto the suction conveyor 18a.

However, it is entirely within the scope of the present invention that any orientation of fruit conveyor 12 may be utilized to obtain the desired relationship between the section cuts and the natural fruit segment separations. And as previously stated, any number of blades may be incorporated into the sectioning blade apparatus, thus yielding any desired number of sections from each fruit half.

Figure 3:
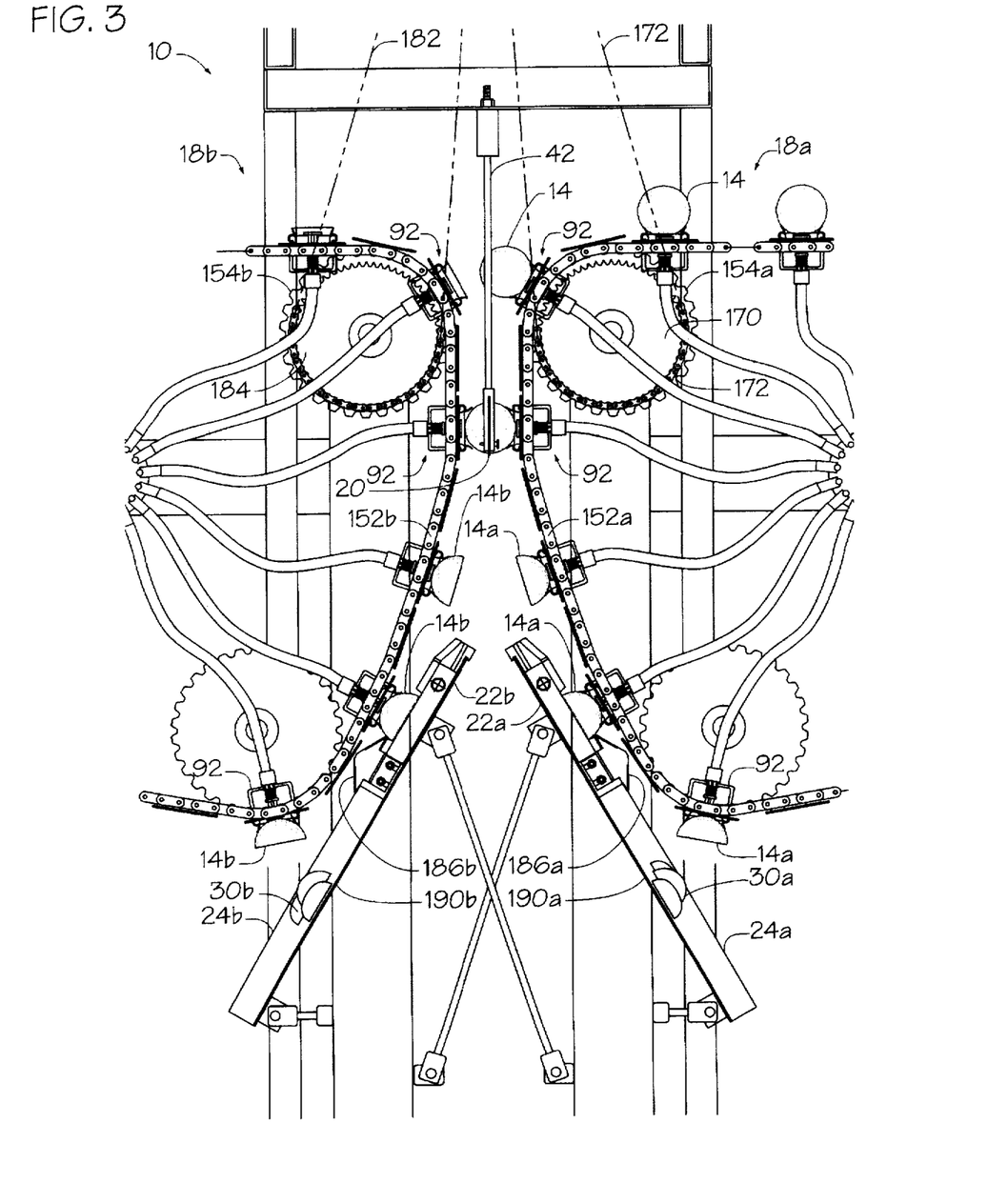
FIG. 3 is a side elevational view in enlarged scale showing the mid-portion of the apparatus of FIG. 1, wherein the fruit is guillotined in half and the meat is later separated and sectioned by the fruit scooping and sectioning assembly.
Figure 4A:
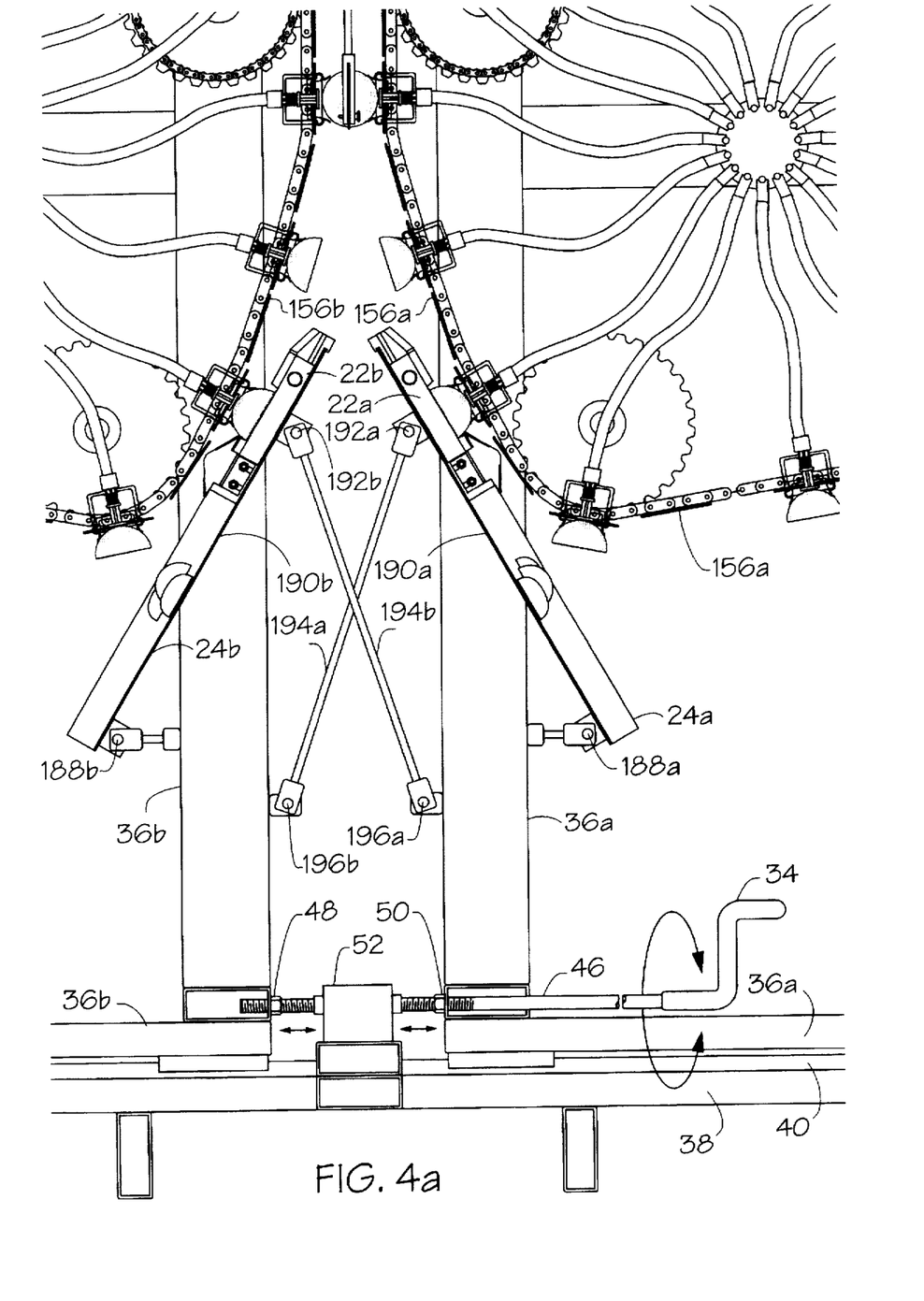
FIG. 4a is a similar side elevation view of the apparatus as shown in FIG. 3, but taken somewhat lower, illustrating the means by which adjustment of the apparatus is made to accommodate different sizes of fruit.
Figure 4B:
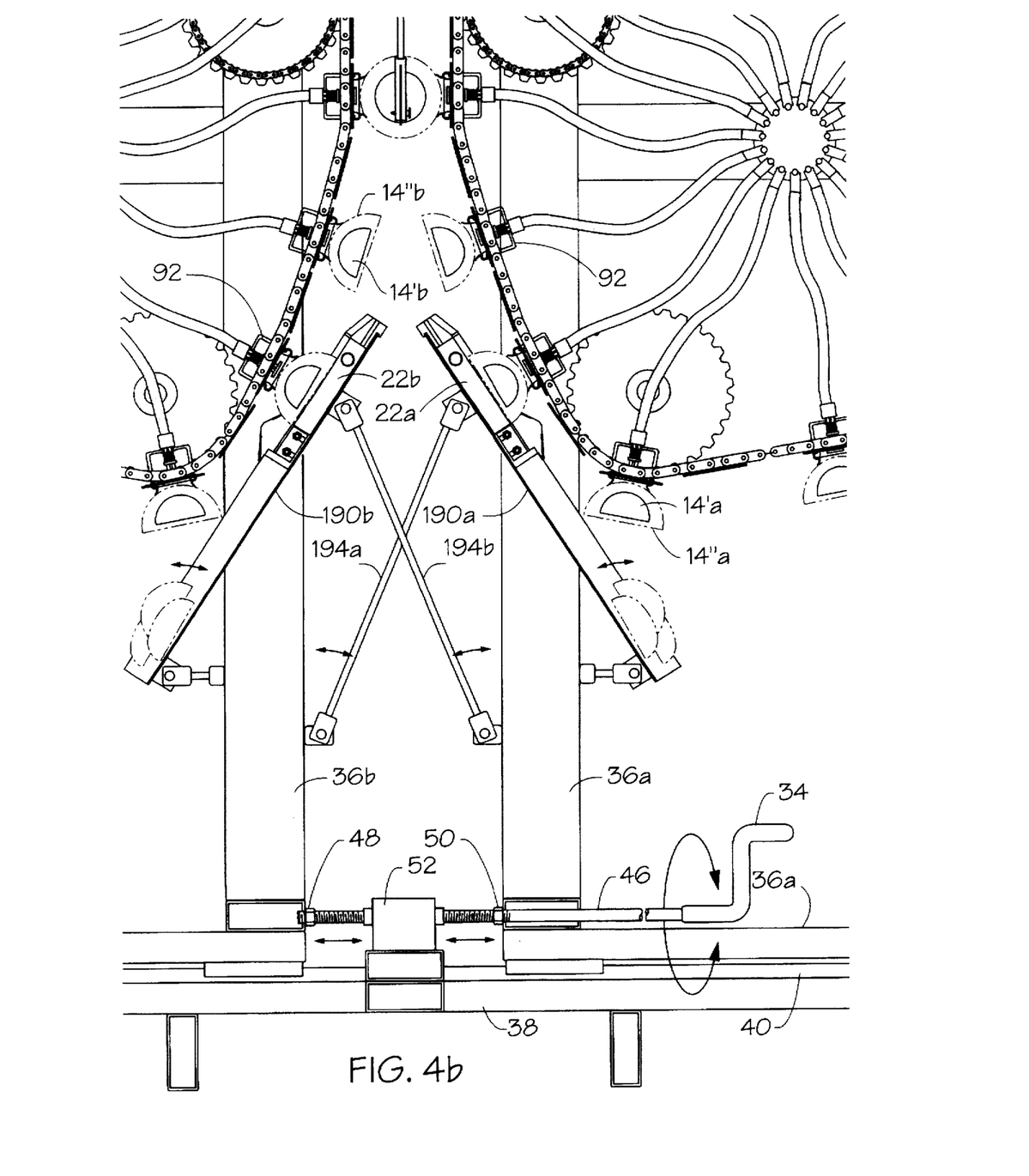
FIG. 4b is the view of FIG. 4a, after the apparatus has been adjusted to accommodate a second, larger size of fruit, the previous smaller size of fruit, which were sectioned according to configuration of FIG. 4a, being shown in the configuration of 4b in dotted outline in FIG. 4b.

As best shown in the enlarged view of FIG. 3, an external-toothed sprocket wheel 170 is provided with an endless chain 172 connected with an upper-toothed gear wheel 174 shown in FIG. 1. Counter-clockwise movement of chain 152a of suction conveyor 18a is caused by counterclockwise movement of sprocket wheel 174 and its associated shaft 176. Shaft 176 is directly geared to shaft 178 by conventional gears described below, so that the counterclockwise rotation of shaft 176 results in a clockwise rotation of shaft 178. Shaft 178, in turn, is connected to a toothed-sprocket wheel 180 coupled to a correspondingly endless chain 182. Chain 182, in turn, is coupled to a toothed-sprocket wheel 184 coupled to the top right hand sprocket wheel 154b of conveyor 18b.

As depicted in FIG. 1, sprocket 174 which drives suction conveyor 18a is driven by a geared motor 173 which also drives an output gear 175. Output gear 175 is coupled to a gear 179 which is coupled to sprocket wheel 180, which drives suction conveyor 18b. In this manner a single source of motive power provides the counter-rotation of sprocket gears 174 and 180. A chain tensioner (not shown) is provided for each of the chains 172 and 182 (see, particularly, FIG. 3) to accommodate the chain stretch as conveyors 18a and 18b are moved apart or together.

As described above, since frames 36a and 36b can be moved outwardly and inwardly toward each other, they must remain synchronized regardless of their relative position with respect to each other. The above described coupling through chains and sprocket wheels allows this coupling and synchronization to be maintained regardless of their distance of separation. Shafts 176 and 178 are journaled in a fixed relationship to the stationary frame 38 while sprocket wheels 154a and 154b are connected to moveable subframes 36a and 36b, respectively. Therefore, the angle of chains 172 and 182 changes allowing the separation of sprockets 154a and 154b by a variable distance allow shafts 176 and 178 and corresponding toothed wheels 174 and 180 to remain at a fixed separation. The movement of frame 36a relative to 36b is relatively limited so that a conventional chain tensioner coupled to chains 172 and 182 can accommodate their extension and contraction as frames 36a and 36b move inwardly or outwardly.

The operation of the suction cup conveyors 18a and 18b now having been described, we turn our attention to the mechanism by which fruit 14 is cored, split and sectioned, as best illustrated in FIGS. 3–9. Fruit 14 is carried by suction conveyor 18a into the central plane of the mechanical peeling apparatus 10 in which guillotine blade 20 and corer 23 are positioned at the end of fixed rod 42, as depicted in FIG. 3. Fruit 14 is brought into position above guillotine blade 20 and corer 23 with an opposing suction cup assembly 92 on conveyor 18b to which vacuum is applied and a suction attachment realized prior to bringing fruit 14 into contact with the guillotine blade 20 and corer 23. Therefore, as seen at the midsection position of suction cup assemblies 92 depicted in FIG. 3, fruit 14 is cored and severed into two approximately equal halves 14a and 14b, and each half separately carried below guillotine blade 20 and corer 23 by its corresponding suction cup assembly 92 of conveyors 18a and 18b, respectively.

Fruit halves 14a and 14b are then brought into contact with fruit scooping and sectioning assemblies 22a and b, respectively, which first scoops the inner meat from the peel and then sections the inner meat by means of sectioning blades 186a and 186b, respectively. The sectioned meat portions 30a and 30b, respectively, then drop down chutes 24a and 24b onto waiting conveyor 26 as depicted in FIG. 1. Meanwhile, the empty peel halves 14a and 14b continue to be retained by suction cup assemblies 92 of conveyors 18a and 18b, respectively, to be transported to their disposal positions.

Before considering the details of the fruit scooping and sectioning assemblies 22a and b, we consider how the cutting mechanism of FIG. 3 is reconfigured to accommodate different fruit sizes. This accommodation can be best understood by comparing the depictions of FIGS. 4a and 4b, which show fruit scooping and sectioning assemblies 22a and 22b in enlarged scale with adjustment rod 46.

Chutes 24a and 24b, together with their corresponding scooping and sectioning mechanisms 22a and 22b, respectively, are carried on a single corresponding plate 190a or b, respectively, which rotates about pivots 188a and 188b, respectively. Pivots 188a and 188b are fixed relative to frames 36a and 36b, respectively. The opposing end of plates 190a and 190b are coupled at pivots 192a and 192b to rods 194a and 194b at one end and at the opposing end of rods 194a and 194b are cross connected to frames 36b and 36a about pivots 196b and 196a, respectively.

Plates 190a and 190b are thus cross-coupled between the opposing frames 36a and b. When rotation of handle 34 causes frames 36a and 36b to be separated, plates 190a and 190b will be rotated and drawn away from caterpillar plates 156a and 156b as shown on FIG. 1 to allow larger fruit to be accommodated between suction cup assemblies 92 and corresponding scoopers and sectionizers 22a and b. For example, in the depiction of FIG. 4b, frames 36a and 36b have been separated and a larger (external diameter) fruit 14'a and 14b substituted for smaller fruit 14'a and b.

Scooping and sectioning assemblies 22a and 22b will similarly be changed to accomodate fruit 14 with relatively larger (internal) meat diameter, as described below, to provide for the proper cut depth and spacing between suction cup assemblies 92 and scooping and sectioning assemblies 22a and b.

Figure 6:
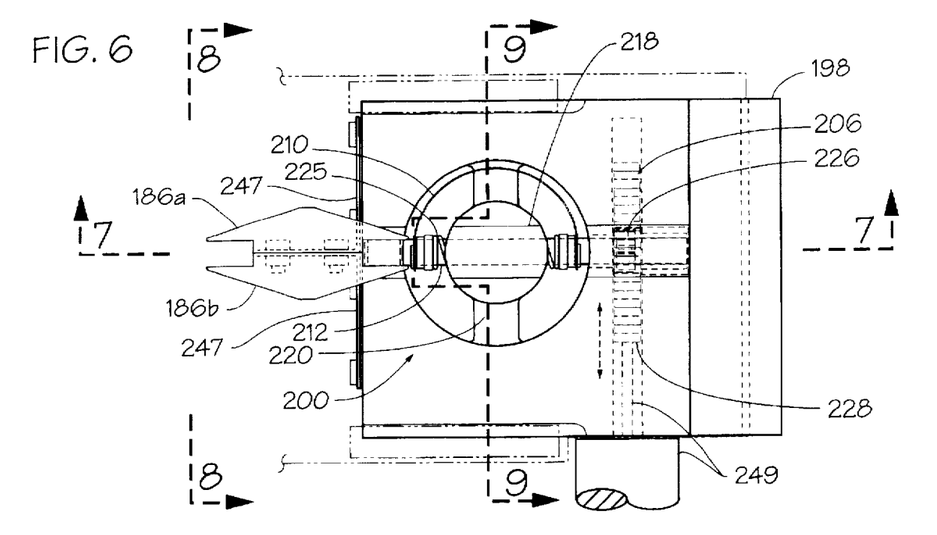
FIG. 6 is a top plan elevational view of the fruit scooper and sectionizer utilized in the apparatus of FIG. 1.

The overall coring, splitting and sectioning mechanism now having been described, we now consider the details of the interchangeable fruit scooping and sectioning assemblies 22a and b, as shown in FIGS. 6–9. FIGS. 6–9 show only one of the scooping and sectioning assemblies 22a, but the design and configuration of all scooping and sectioning assemblies 22a and b are identical and interchangeable. FIG. 6 shows a top elevational plan view in which scooping and sectioning assembly 22a is comprised of a quick-change, interchangeable base 198, sectioning blades 186a and b, and a scooper assembly, generally denoted by reference numeral 200. Base 198 is attached to plate 190a by means of two hold-down clips and a front anchor clip, in a manner which will be clear to the reasonably-skilled practitioner. The insertion of a replacement scooping and sectioning assembly 22a designed for a different or same sized fruit can thus be quickly placed in the proper operative position within the mechanical peeling apparatus 10.

Scooper assembly 200 is comprised of a semicircular blade 210 typically fabricated from a band of bendable metal with at least one highly sharpened knife edge and mounted on a shaft 212. In the preferred embodiment blade 210 is sharpened on both opposing edges to allow cutting in both directions or to provide a second cutting edge for use by reversing the blade end-to-end on shaft 212 when the first edge dulls. Shaft 212 is best seen in isolated side view in FIG. 7a and in perpendicular cross-sectional view in FIG. 7b. Shaft 212 extends longitudinally through base 198 as depicted in both FIGS. 6 and 7, and semicircular blade 210 is disposed at either ends of its travel within one side or the other of a circular slot 214 defined into base 198. Shaft 212 is supported on either side of blade 210 by bushings 248. Center block 218 is connected to base 198 by means of segments 220, as shown in FIG. 6. As shown in FIG. 7a, the ends of blade 210 are disposed through slots 222 defined through shaft 212 and retained therein by a pair of collars 224 which are urged apart by compression spring 225. Blade 210 has a notch 227 at each of its ends as shown in FIG. 9 into which collar 224 extends to lock blade 210 to shaft 212.

Figure 7:
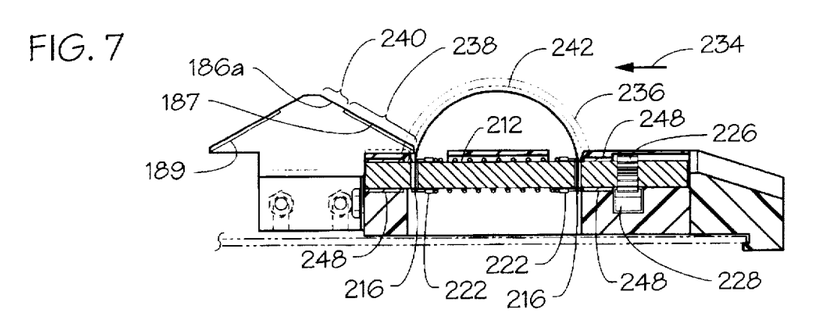
FIG. 7 is a side cross sectional view of the scooper and sectionizer of FIG. 6 as seen through suction lines 7—7 in FIG. 6.
Figure 7A:
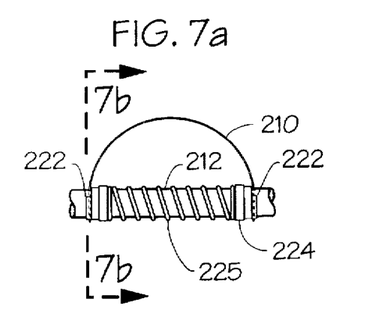
FIG. 7a is a side view of the semicircular knife and its shaft shown in isolation.
Figure 7B:
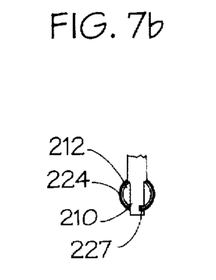

Shaft 212 is coupled at its right end as shown in FIGS. 6 and 7 to a pinion gear 226. Pinion gear 226 in turn is coupled to a rack 228, illustrated in FIG. 7. Rack 228 is connected to an air piston 249 which translates it transversely across the width of base 198 to reciprocate shaft 212 through approximately 210 degree turns. In this manner, blade 210 is rotated from an initial position 230 shown on dotted outline in the cross-sectional view of FIG. 9 taken through section lines 9—9 of FIG. 6, to a cutting position shown in solid outline, generally denoted by reference numeral 232, and finally into a rest position within slot 214 at the far end of its travel. Blade 210 will therefore cut a hemispherical section through fruit 14 which is carried into position and centered over portion 218 of base 198 by suction conveyor 18a. As shown in FIG. 1, the position of fruit 14 is synchronized or aligned appropriately with blade 210 by means of the optoelectronic sensor 15 coupled to a computer 17 which monitors the position and speed of plates 156a in suction conveyor 18a and hence position of fruit 14.

Fruit 14 is thus moved from right to left in the depiction of FIGS. 6 and 7 as shown by the direction of arrows 234 in FIG. 7. At this point in the process, the peel of fruit 14 is still securely held by suction cup assembly 92 of suction conveyor 18a, and the scooped meat is still captured between the peel of fruit 14 and base 198.

Figure 8:
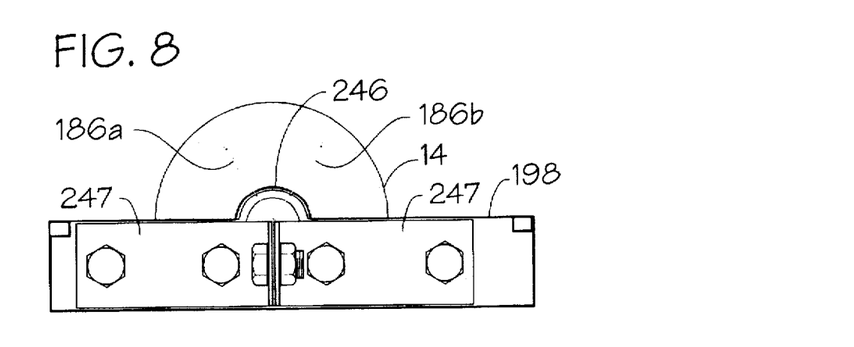
FIG. 8 is an end elevational view of the fruit scooper and sectionizer of FIG. 6, as seen through lines 8—8 and FIG. 6.
Figure 9:
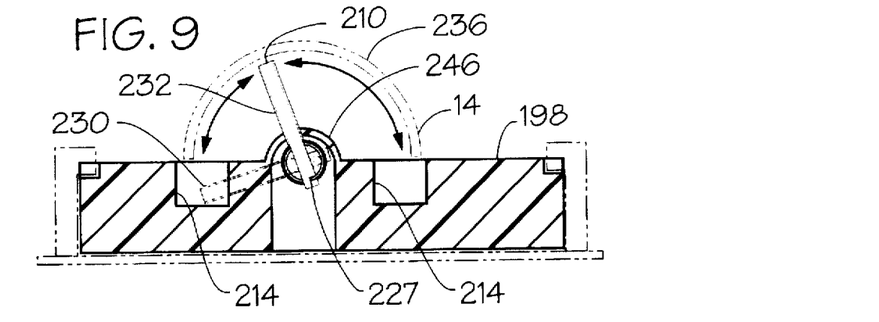
FIG. 9 is a end cross sectional view of the fruit scooper and sectionizer of FIG. 6, as seen through section lines 9—9 of FIG. 6.

Suction conveyor 18a continues to move the scooped fruit 14 to the left as shown in FIG. 7, at which point the peel 236 of fruit 14 shown in dotted outline in FIGS. 7 and 9 meets sectioning blades 186a and b. Sectioning blades 186a and 186b are preferably provided in a dihedral pair (to generate three sections from each fruit meat half), as best shown in the end view of FIG. 8 taken through section lines 8—8 of FIG. 6 and form a double triangle when seen in side view as shown in FIG. 7 so as to resemble a delta wing. The front or right most portion 238 of blades 186a and 186b is provided with a highly sharpened edge 187 which ends in a dull portion 240 on the trailing edge. A symmetrical edge 189 is provided on an identically shaped portion of blades 186a and 186b to provide a replacement cutting edge when edge 187 becomes dull. Blades 186a and 186b are simply reversed end-to-end, and edge 189 is utilized. After both edges 187 and 189 dull, blades 186a and 186b are sharpened or replaced.

Knife edges 187 and 189 are each provided with a very sharp edge portion 238 which cleanly cut through peel 236 easily sectioning the meat. However, sectioning blades 186a and 186b must cut the meat approximately all the way to the inner surface 242 of peel 236. Note that rubber suction cup 112 is still attached to rind 236 at this point in the operation, since fruit 14 is still being carried by suction conveyor 18a. Trailing edge portion 240 of blades 186a and 186b contact rubber suction cup 112 and, if sharpened, would either cut through suction cup 112, rendering the cup 112 useless, or at least completely or substantially cut through peel 236 opening slits through which the vacuum in suction cup 112 would be substantially lost and the attachment of peel 236 to suction conveyor 18a lost. Therefore, trailing edge portion 240 of blades 186a and 186b is dulled so that it merely deforms suction cup 112 and scores peel 236 without cutting either. However, the thinness of sectioning blade 186a is nonetheless still sufficient to continue and complete the sectioning cut entirely through the much softer meat, at least to the limit of the hemispherical cut made by blade 210. As a result, rind 236 is not cut by trailing portion 240 and the vacuum seal is not lost between rind 236 and suction cup 112, but rind 236 is at most scored or temporarily deformed as fruit 14 is pulled through sectioning blades 186a and 186b by suction conveyor 18a.

For example, when new, sharpened portion 238 of blades 186a and b will have substantially microtome sharpness, whereas portion 240 will be dull to the touch. Of course, as blades 186a and 186b are used, the sharpness of portion 238 will, of course, gradually decrease. In commercial production runs, it is expected that blades 186a and 186b will need to be replaced or at least rotated to a new cutting edge 189 on a daily basis for a 24-hour run. To facilitate this, blades 186a and 186b are fabricated to be mounted by a pair of bolts to a bracket 247 which is bolted into the end of base 198 as best seen in FIGS. 6, 7 and 8. Dull blades 186a and 186b can thus be reversed and/or renewed as needed on scooping and sectioning assemblies 22a and b without the need of laboriously resharpening blade edge portion 238 on site.

Blade 20 as shown on FIG. 2a includes slanted guillotine portions 21 which will halve fruit 14, and also a corer portion 23 which will automatically core fruit 14. As shown coring blade 23 is configured with an especially designed V-shaped cutting survace, which insures dissection and coring without dislodging fruit 14 from cup 92a,b. It was discovered that while a straght edge coring blade might function, it would be likely to cause unnecessary fruit distortion and possible dislocation of the fruit 14 from the cups 92a,b. Each successive core will be pushed out by the next succeeding core and will drop into collection bin 25 or through a chute to a waste conveyor (not shown), for disposal. The cylindrical core removed from fruit 14 is sized to allow fruit 14 to clear a central cylindrical area 246 of the scooping and sectioning assembly 22a and b, shown in elevational view in FIG. 8 and in cross-sectional view in FIG. 9. This area is provided to allow blade 210 to rotate on center within fruit 14 and to permit sufficient space for shaft 212 to be aligned on the fruit axis.

Once fruit 14 is thus completely drawn across scooping and sectioning assembly 22a and 22b, the scooped and sectioned meat chunks are released from peel 236 and allowed to fall freely down chutes 24a and b. Peel 236, however, continues to be carried by suction conveyors 18a and b, as described above in connection with FIG. 1, until it reaches a release point at which time the vacuum is removed and the peel released from the conveyor. A vacuum manifold 248, by which this operation is implemented, is best shown in simplified diagrammatic view in FIG. 5 and as depicted in greater detail in FIGS. 10–12.

The manifold, generally denoted by reference number 248, is comprised of a rotating portion 250 into which the plurality of vacuum hoses 252 are fitted, each with a communicating orifice 254. Hoses 252 and rotating portion 250 rotate with the movement of suction conveyors 18a and 18b which is why the double caterpillar-type suction conveyor system is required to be carried by spaced-apart sprockets 154a and b. Rotating portion 250 is disposed against and sealed with a nonrotating vacuum manifold 260 into which a plurality of circular slots have been machined, as diagrammatically illustrated in FIG. 5 by slots 256 and 284, and shown In detail in FIG. 12. Vacuum manifold 260 is nonrotating and bolted in place with respect to frames 36a and b. As manifolds 250 and 260 rotate with respect to each other, selected ones of the orifices 254 connected to hoses 252 will be exposed to slots 256 or 284 and a vacuum communicated to orifices 254 through slots 256 to suction cup assemblies 92 or vented to atmosphere through slot 284 as described below. The configuration of slots 256 in the orientation of the nonrotating vacuum manifold relative to suction conveyors 18a and 18b then provide a means whereby vacuum can be selectively applied to each suction cup assembly 92 at the appropriate position in suction conveyors 18a and b. Once the vacuum is released, the orifices 254 are then vented to the atmosphere, the vacuum lost, and spring 102 will activate finger 100 ejecting the release rind from vacuum cup assembly 92.

Figure 5:
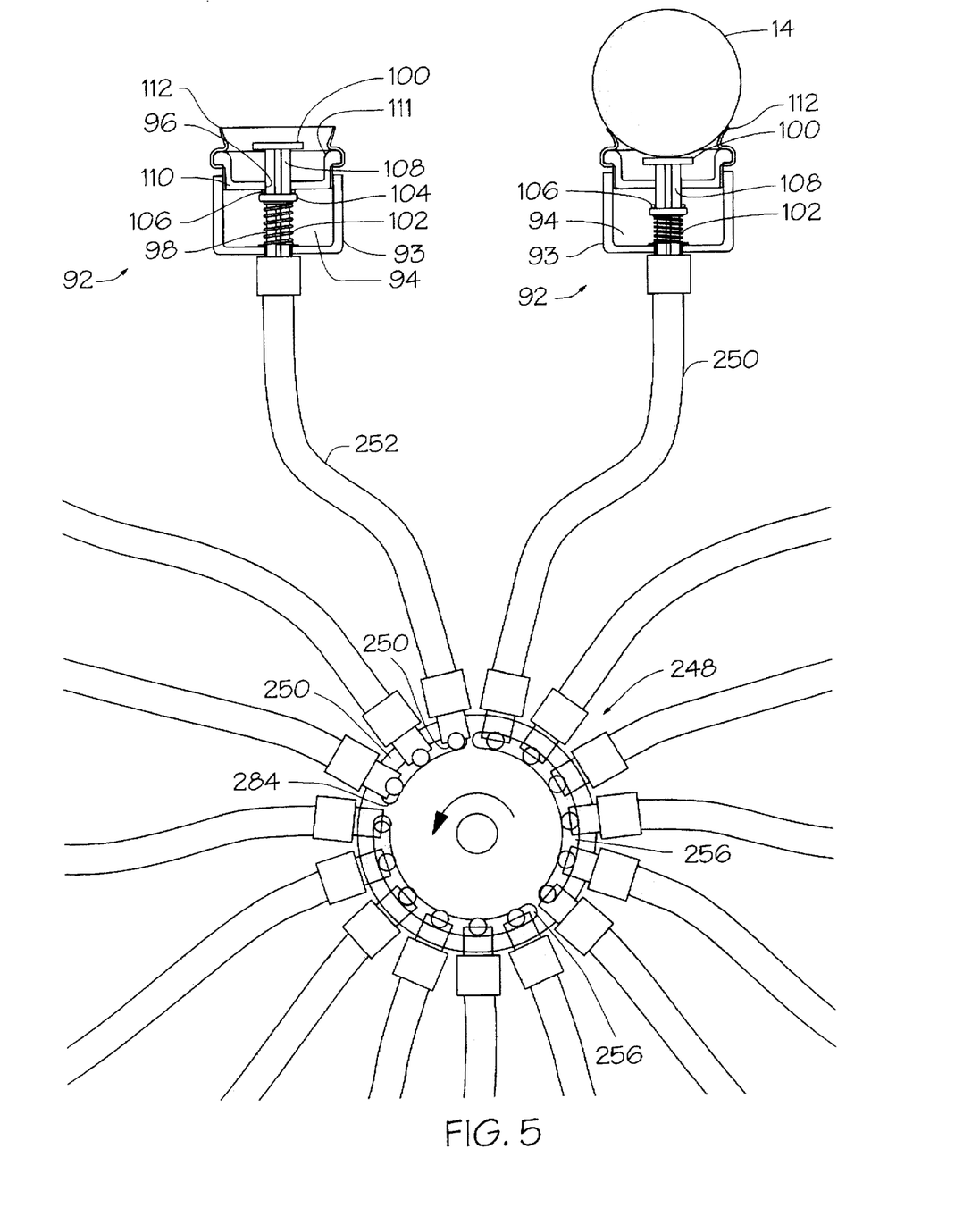
FIG. 5 is a simplified side cross sectional view of one of the two the suction cup and connected vacuum manifolds used in the suction cup conveyor illustrated in FIGS. 1–4b.
Figure 10:
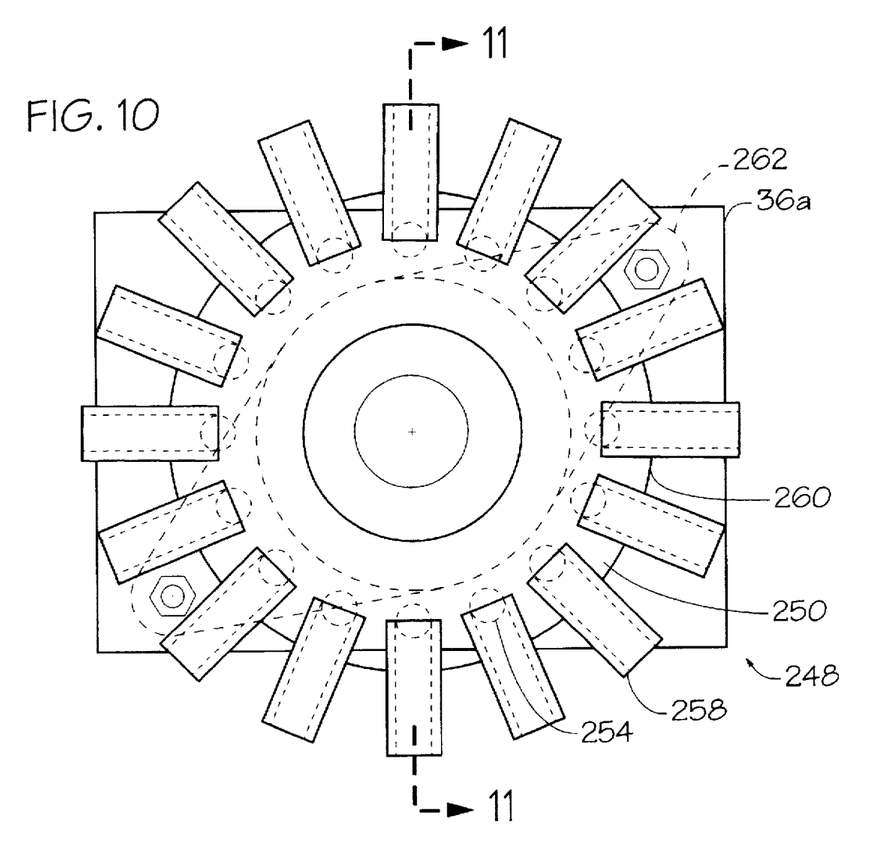
FIG. 10 is an end elevational view of the vacuum distributor.
Figure 11:
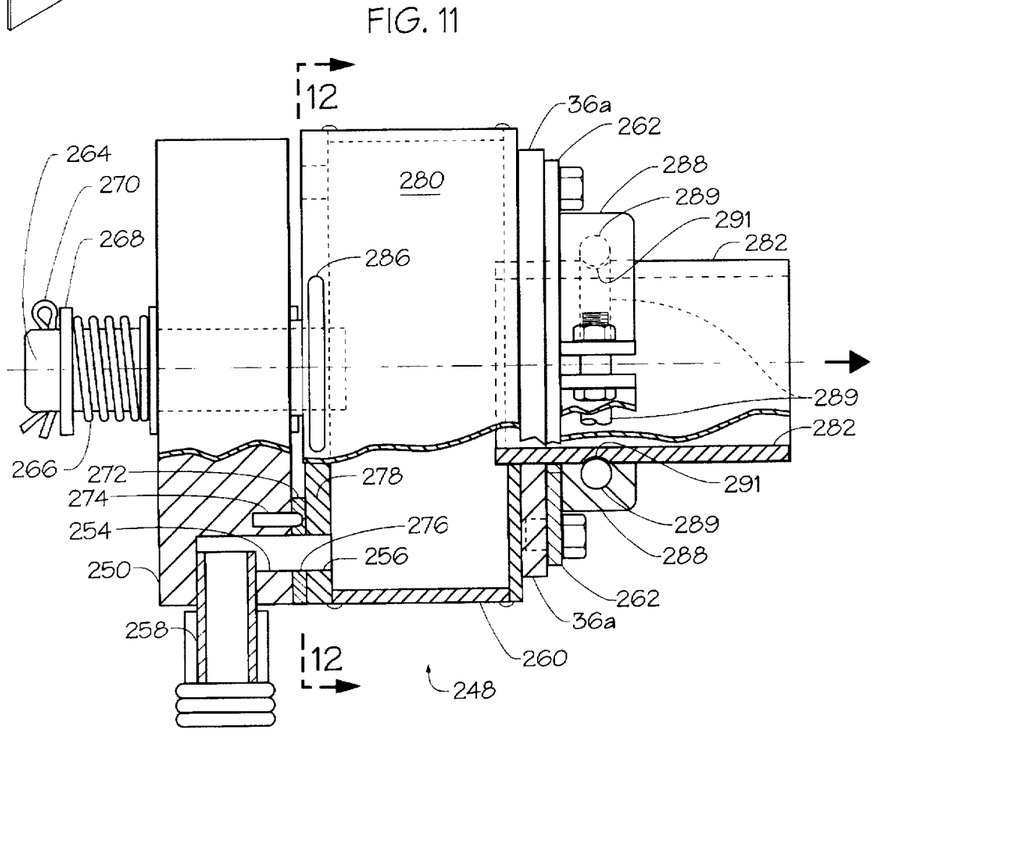
FIG. 11 is a partially cut-away, side cross-sectional view of the vacuum distributor of FIG. 10 as seen through section lines 11—11 of FIG. 10.
Figure 12:
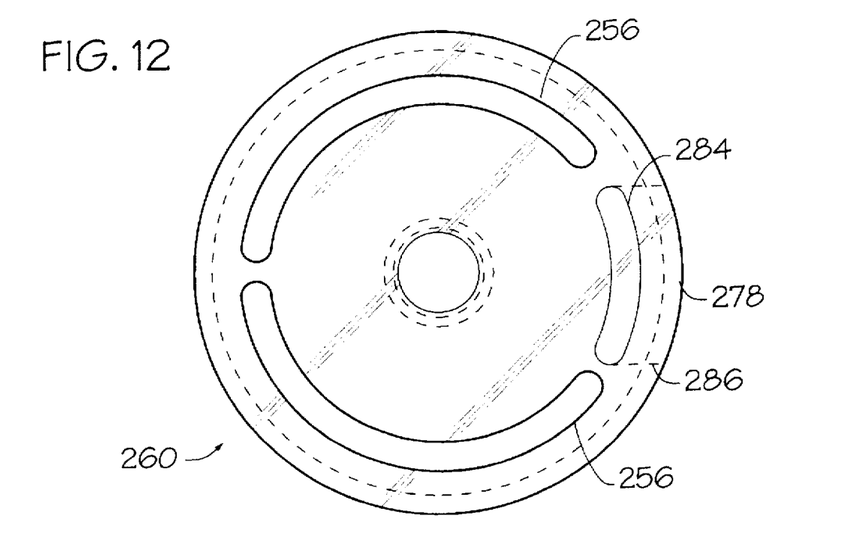
FIG. 12 is a cross-sectional view of the vacuum distributor of FIG. 11 as seen through section lines 12—12 of FIG. 11.

FIGS. 10–12 better illustrate the details of vacuum manifold 248, which is only diagrammatically illustrated in FIG. 5. Vacuum manifold 248 as shown in the end elevational view of FIG. 10 includes, in the illustrated embodiments, a plurality of orifices 254 each provided with a fitting 258 to which vacuum hose 252 is coupled (omitted from view of FIGS. 10–12 for clarity). Fittings 258 are coupled to rotating portion 250 which in turn is coupled as shown in FIG. 11 to a stationary portion 260, which is bolted by means of flange 262 to frame 36a or 36b as may be appropriate.

As better depicted in side cross-sectional view of FIG. 11, taken through section lines 11—11 of FIG. 10, rotating portion 250 rotates about a fixed pin 264 which is spring-loaded against fixed portion 260 to which pin 264 is welded by means of compression spring 266. One end of spring 266 bears against rotating portion 250 while the opposing end of spring 266 bears against a washer 268 held in place by cotter pin 270 disposed through pivot pin 264.

A leak-tight seal is established between rotating portion 250 and fixed portion 260 by means of a low-friction plastic sealing washer 272 held in place by a fixing pin 274 fixed in rotating portion 250 and extending into washer 272. A plurality of orifices 276 are defined through washer 272 to permit communication with orifices 254 of rotating part 250 and slots 256 defined in a front plate 262 of fixed portion 260. Fixed portion 260 is comprised of its facing plate 262 together with slots 256, as described in greater detail in connection with FIG. 12 and as diagrammatically shown in FIG. 5. A vacuum manifold 280 communicates with a vacuum inlet 282. Vacuum inlet 282 is connected through a vacuum hose to a vacuum source (not shown).

Facing plate 278 of fixed portion 260 of vacuum distributor 248 is best depicted in the cross-sectional view of FIG. 12 taken through section lines 12—12 of FIG. 11. A first slot 256 is defined through face plate 278 which is shown in the embodiment of FIG. 12 as comprised of two segments in order to give mechanical integrity of face plate 278. When any one of the orifices 254 overlaps slot 256, a vacuum is communicated to suction cup assemblies 92. In the illustrated embodiment slot 256 spans approximately 270 degrees of face plate 278.

A second blind slot 284 is defined in face plate 278 but does not penetrate through the thickness of face plate 278. Instead, a communicating slot 286 is defined in the body of face plate 278 which vents slot 284 to atmosphere, but does not communicate with vacuum manifold 280. In other words, slot 284 is communicated to atmosphere through the side of fixed portion 260 and in particular through a side slot defined within the thickness of face plate 278. Therefore, when any one of the orifices 254 overlap slot 284, the vacuum in the corresponding suction cup assembly 92 is lost and ejector finger 100 activated.

The angle orientation of vacuum distributor 248 relative to frame 36a or 36b is determined according to clamp 288 shown in FIG. 11. Clamp 228 is comprised of a two piece collar which is bolted together on each side to compress a metal split ring 289 into a ring groove 291 defined in vacuum inlet 282. Clamp 288 is fixed to plate 262, which is bolted to stationary frame 36a. A similar clamping arrangement is provided for conveyor 18b and frame 36b. Thus, fixed portion 260 may be angularly rotated and then clamped into place by means of clamp 288 to assume a fixed angle orientation relative to frame 36a and, hence, to angularly orient vacuum slot 256 or venting slot 284 as desired to obtain the appropriate selective angular orientation for distributing vacuum and venting as needed in suction conveyor 18a in order to define the attachment and release points of suction cup assemblies 92 in suction conveyor 18a.

The manner in which suction cup assemblies 92 function may best be understood by reference to FIG. 5. Here, cup housing 93 surrounds the vacuum chamber 94, which is sealed at the venting orifice 96 by an O-ring 106 which surrounds the shaft of the ejection finger 98, between its sealing flange 104 and the base 110 of the cup cap 111. When a fruit 14 is pressed into the flexible fruit cup 112, against the fruit contact flange 100, this action causes the ejection finger 98, which is rigidly attached to the fruit contact flange 100, to partially withdraw throught the venting orifice 96. This breaks the aforementioned seal which had maintained a vacuum within the vacuum chamber 94. That, in turn, causes air trapped within the space defined by the fruit 14, the flexible fruit cup 112 and the cup cap 111 to be sucked out through the longitudinal grooves 108 in the shaft of the ejection finger 98, and a vacuum within that space is thus generated. Accordingly, although resultant compression of the spring 102 surrounding the shaft 98 of the ejection tends to cause the ejection finger 98 to push the fruit 14 outward, out of the flexible fruit cup 112, atmospheric pressure working against the vacuum holds the fruit 14 in place. This is the condition shown in the right suction cup assembly 92 shown in FIG. 5.

When the vacuum in the suction cup assembly 92 is released, the resistance to extension of the compressed spring 102 disappears, and the fruit 14 is ejected by the forward spring-generated force of the fruit contact flange 100 of the ejection finger 98. However, when the ejection finger 98 advances sufficiently for its sealing flange 104 and the O-ring 106 to once again contact the base 110 of the cup cap 111, the seal is restored and a vacuum may once again be maintained within vacuum chamber 94. This is the condition shown in the left suction cup assembly 92 shown in FIG. 5.

Finally, it should be pointed out that while principal reference has been made in the above discussion to the operation of the described apparatus and method in respect to citrus fruit, it could easily be applied to many other types of fruit, such as apples or pineapples, or even to other non-fruit items with minor modification well within the skill of the practitioner having ordinary skill in the art.

Many further alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to include by special definition in this specification, structures, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result.

Insubstantial changes from the claimed subject matter as viewed by a person with ordinary skill in the art, now known or later devised, are expressly contemplated as being equivalently within the scope of the claims even though not performing substantially the same function in substantially the same way to obtain substantially the same result. Therefore, substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. The apparatus for extracting at least one chunk of meat from a cut fruit section, said fruit section having a peel and meat therein, comprising:

rigid base, having a straight line defined therein;

at least one slicing blade extending outwardly from said straight line;

a cutting band rotatable about said straight line;

first motive means to cause relative motion between said slicing blade and said fruit section said first motive means causing said slicing blade to create a linear cut within the meat in said fruit section; and second motive means to cause said cutting band to rotate through the meat of said fruit section after said cut has been imposed therein.

2. The apparatus as recited in claim 1, wherein said fruit section comprises one half of a fruit, said fruit having an axis, said fruit having been halved by means of a planar cut through the axis thereof, and said slicing blade produces a cut extending from said planar surface to the proximity of the inside of the peel.

3. The apparatus as recited in claim 2, wherein the radius of said cutting band is substantially identical to the maximum radius of the meat of said fruit about the axis thereof.

4. The apparatus as recited in claim 1, wherein:

said rigid base includes a semi-cylindrical member extending along said line; and said fruit section contains a semi-cylindrical void about the axis thereof, and said first motive means causes said fruit section to move across said rigid base by sliding said semi-cylindrical void along said semi-cylindrical member of said rigid base.

5. The apparatus as recited in claim 1, wherein said slicing blade extends along said straight line and the width of said slicing blade, measured outwardly from said straight line to the outer periphery of said slicing blade, increases from a minimum at the leading edge of said slicing blade to a maximum which is not substantially greater than the radius of the meat within said fruit section.

6. The apparatus as recited in claim 5, wherein the edge of said slicing blade is sharp from its leading edge to a selected distance behind said leading edge, and dull in the portion of said slicing blade in proximity to the region of said blade having its maximum width.

7. The apparatus as recited in claim 6, wherein said slicing blade is substantially symmetric about a line radially outward from said straight line to the point on the periphery of said blade having maximum width.

8. The apparatus as recited in claim 7, wherein the trailing edge of said slicing blade is sharpened symmetrically with the sharpened portion of its leading edge.

9. The apparatus as recited in claim 1, having at least two said slicing blades.

\* \* \* \* \*